United States Patent [19]

Van Liempd et al.

[11] Patent Number: 5,106,721
[45] Date of Patent: Apr. 21, 1992

[54] METHOD OF RECORDING INFORMATION, RECORDING ELEMENT MANUFACTURED ACCORDING TO THE METHOD AND METHOD OF PRODUCING A METAL MATRIX

[75] Inventors: Johannes P. J. G. Van Liempd; Josephus M. Wijn, both of Eindhoven, Netherlands; George H. Johnson, Wilmington; Howard E. Simmons, Newark, both of Del.

[73] Assignee: U.S. Philips Corporation, New York, N.Y.

[21] Appl. No.: 614,799

[22] Filed: Nov. 14, 1990

Related U.S. Application Data

[62] Division of Ser. No. 263,095, Oct. 26, 1988, Pat. No. 5,001,035.

Foreign Application Priority Data

Jan. 6, 1988 [NL] Netherlands ............ 8800014

[51] Int. Cl.$^5$ ............................................. G11B 3/70
[52] U.S. Cl. ..................................... 430/320; 430/270; 430/328; 430/945; 427/299; 427/404
[58] Field of Search ............... 430/321, 945, 270, 495, 430/320, 328; 346/135.1, 76 L; 427/299, 404

[56] References Cited

U.S. PATENT DOCUMENTS

| | | | |
|---|---|---|---|
| 4,565,772 | 1/1986 | Takeoka et al. | 430/320 |
| 4,719,615 | 1/1988 | Feyrer et al. | 369/284 |
| 4,780,867 | 10/1988 | Lind et al. | 369/284 |
| 4,861,699 | 8/1989 | Wijdenes et al. | 430/321 |

Primary Examiner—Charles L. Bowers, Jr.
Assistant Examiner—Lee C. Wright
Attorney, Agent, or Firm—Norman N. Spain

[57] ABSTRACT

Method of recording information, recording element manufactured according to the method and method of producing a metal matrix.

Recording in which a recording double layer which has an absorbing dye is exposed to laser light of a higher and a lower energy level, in which by exposure to laser light of the lower energy level, a bump is formed in the recording layer and in which by exposure to laser light of the higher energy level a bulge is formed which at the surface comprises a groove, as well as a recording element obtained by using the method and a method of manufacturing a metal copy from the recording element.

1 Claim, 1 Drawing Sheet

METHOD OF RECORDING INFORMATION, RECORDING ELEMENT MANUFACTURED ACCORDING TO THE METHOD AND METHOD OF PRODUCING A METAL MATRIX

This is a division of application Ser. No. 263,095, filed Oct. 26, 1988 now U.S. Pat. No. 5,001,035.

BACKGROUND OF THE INVENTION

The invention relates to a method of recording information which can be read optically while using a recording element which is exposed to modulated laser light and which comprises a substrate plate and a recording double layer of a synthetic resin provided on one side, of which a first layer of synthetic resin which engages the substrate, has a comparatively high coefficient of thermal expansion and a glass transition temperature which is below room temperature and a second layer of synthetic resin of which is bonded to the first layer has a comparatively low coefficient of thermal expansion and a glass transition temperature which is above room temperature.

Such a method is described in European Patent Application no. 0136070. According to the method known from this Application information is recorded, read and erased again, while using the above-mentioned recording element. Thus being a reversible process.

Upon recording information the recording element on the side of the recording double layer is exposed to laser light which has been pulsated in accordance with the digitalised information to be recorded. As a result of this exposure the first layer of synthetic resin—which will hereinafter also be referred to as the lower layer or expansion layer—is heated in the exposed places, the material expanding considerably. The heating is caused by the expansion layer absorbing the laser light used. The second layer of synthetic resin—hereinafter the referred to as top layer or retention layer—is slightly heated in the exposed places because said layer is transparent or substantially transparent to the laser light used. This slight heating is caused by thermal conductivity from the heated lower layer or by a slight direct absorption or the laser light by the top layer.

The temperature of the top layer increases to slightly above the glass transition temperature at which temperature the material is rubbery. As a result of the expansion of the lower layer the top layer is forced upwards and a bump is formed. Upon cooling, the top layer rapidly gives off a small quantity of thermal energy as a result of which the temperature below the glass transition point and the top layer balls a rigid structure. The lower layer is still in a heated and hence expanded state. Upon further cooling the lower layer cannot further shrink because it is fixed to the top layer bonded thereto. The bump hence does not disappear. A tensile force is exerted on the deformed top layer by the lower layer. The recorded information bit, in this case the bump, can be read by means of laser light on the basis of phase differences.

In the erasing process laser light is used of a different wavelength which is absorbed by the top layer and is passed by the lower layer. The top layer is heated to above the transition point. As a result of the tensile forces mentioned hereinbefore exerted by the lower layer the rubbery, the heated top layer is reverted to its original position and the bump is erased.

In order to cause the lower layer at a first wavelength to be absorbing at a first wavelength and to be transparent at a second wavelength and the top layer to be the reverse, namely transparent at the first wavelength and absorbing to laser light of the second wavelength, dyes are used in the lower layer and in the top layer which have essentially deviating absorption characteristics.

From test series performed by the Applicants it has been found that the known method described above has for its disadvantage that upon recording bits (bump) of different longitudinal dimensions the width dimensions of the bits vary. Thus where the length of the bits increases, the width also increases. However the increase in width is not proportional to the longitudinal increase. In connection with this it should be noted that length modulation is of importance, for example, a bit length modulation is necessary to record information modulated according to the EFM (eight out of fourteen modulation) system. In the very known optical audio discs known as compact discs the sound information is recorded according to the EFM system. Bits are used having lengths of 0.9 $\mu$m, 1.2 $\mu$m, 1.5 $\mu$m, 1.8 $\mu$m, 2.1 $\mu$m, 2.4 $\mu$m 2.7 $\mu$m and 3.0 $\mu$m.

Since the bits have different width dimensions, the width of the information track which usually is piral-like, is not constant. As a result of this the space between the turns of the spiral-like track varies in an unpredictable manner. Consequently, the above-mentioned known method is not suitable for recording EFM modulated information. The information density is not optimal since it is determined in particular by the width of the track and the associated width of the track pitch.

SUMMARY OF THE INVENTION

The present invention has for its object to provide an optical recording method in which bits of different longitudinal dimensions can be recorded in the recording layer, which bits have the same width or substantially the same dimensions.

A second object of the invention is to provide an optical recording method in which the recorded bits have a small width dimension as a result of which a high information density is obtained. An additional object of this invention is provide an improved method for the manufacture of metal matrices suitable for use in the production of optically readable synthetic resin information carrier.

According to the invention the first two objects are achieved by means of a method of the type mentioned in the opening paragraph which is characterized in that a recording element is used of which both layers of synthetic resin of the double layer comprise a dye which absorbs the laser light used and that laser light of a higher and lower energy level is used, in which a bump is formed in the recording layer by exposure to laser light of the lower energy level and in which a bump which comprises a groove of its surface is formed by exposure to laser light of the higher energy level.

The first (lower) layer of synthetic resin of the recording double layer has a glass transition temperature which is considerably lower than room temperature. The material of said lower layer at room temperature consequently is rubbery at room temperature. Besides the above-mentioned high coefficient of thermal expansion the material of the lower layer preferably also has a low thermal conductivity. A small area of the lower layer can be heated rapidly with little laser light energy as a result of which a rapid and considerable local expansion occurs by which a bit is formed. The lower layer has a cross-linked structure with a comparatively high cross-linking density so that upon expansion an elastic and not a plastic deformation takes place. The material of the lower layer preferably is an elastomer, for example, a natural or synthetic rubber. A suitable material which provides very good results is a polyurethane elastomer.

The material of the second layer of synthetic resin (top layer) of the recording double layer has a glass transition temperature which is well above room temperature, for example, a transition temperature of 80° C. At room temperature the material is vitreous; above the transition temperature the material is rubbery. The thermal expansion is comparatively low. The material of the said top layer, as well as the material of the lower layer, has a low thermal conductivity. By using a comparatively low quantity of laser light energy an area of the top layer is rapidly heated which as a result of this shows a comparatively small expansion. The material of the top layer, in contrast with that of the lower layer, has a comparatively high modulus of elasticity.

According to an additional aspect of the invention, metal matrices suitable for use in production of optically readable synthetic resin information carriers are manufactured by providing a metal shell on the surface of the recording double layer provided on the recording element employed in the method of recording of the invention, first in an electrodeless manner and then by electroplating, and removing the resultant metal shell, the structure of the recording element having been copied in the structure of the resultant metal shell (metal matrix).

DETAILED DESCRIPTION OF THE INVENTION

Figure 1:
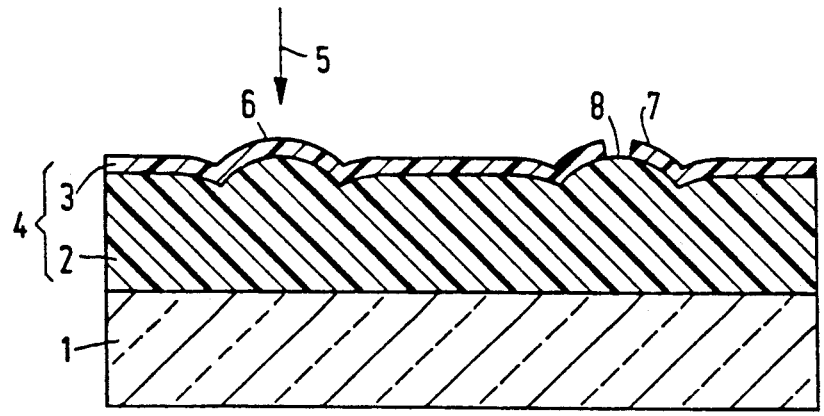
FIG. 1 is a cross-sectional view of the recording element of the invention.

Suitable synthetic resins for the top layer are cross-linked polymers having a comparatively low cross-linking density. Suitable polymers are polystyrene, polycarbonate, polyacrylates, polymethacrylates as well as synthetic resins such as silicone resins, alkyd resins and epoxy resins. A very good material is a cross-linked epoxy resin. With respect to materials of the top layer and the lower layer further reference may be made to European Patent Application no. 0136070 mentioned hereinbefore the contents of which are incorporated in this Specification by reference.

The laser light used preferably originates from a laser which emits bluish-green light, for example, a laser having an emission wavelength of 458 nm, 488 nm or 514 nm. The dyes used in the top layer and the lower layer of the double layer are red or yellow dyes which absorb light of the above-mentioned wavelength. Chemically different dyes may be used in the top layer and the lower layer. The condition is that these dyes absorb the blue laser light and hence show an absorption maximum in the blue spectrum range.

While recording information the recording element is rotated, for example, at a speed of rotation of 3–10 Hz. The laser light beam which is focused on the recording double layer is moved diametrically over the recording element. Upon exposure to the laser light of the lower energy level a bump is formed in the recording double layer. By using a variable exposure time the longitudinal dimension of a bump is varied. However, in the method according to the invention the width dimension of the bumps remains the same or substantially the same. Recording of information which is modulated according to the EFM system hence is possible.

Upon exposure to the laser light of the higher energy level a bump is formed which comprises a groove at the top (upper side). The groove has a very small width of approximately 0.1–0.4 $\mu$m and in particular of 0.1–0.2 $\mu$m. When a longer exposure of time is used both the bump and the groove (slot) become longer. The width dimensions of both the slot and the bump remain unvaried or substantially unvaried. At the higher energy level recording of information which has been modulated according to the EFM system is also possible. This may even be achieved in two ways. In the first instance the formed bumps having a variable length and the same width are representative of the recorded information. In the second instance the grooves provided in the bumps which have a variable length and the same width are also representative of the recorded information. As a result the method according to the invention presents the possibility, in addition to the single recording (lower energy level), of a double recording (higher energy level). By way of example two information tracks may be used in this manner, the turns of which extend parallel —in a so-called double track—. For example the information in one track may be recorded in the form of bumps and in the other track it may be recorded in the form of bumps which comprise grooves on their top. In the second track the bumps and the grooves present therein may optionally be read separately so that a "double check" is possible.

The process in which the grooves (c.q. slots) are formed is still not quite clear. There are clear indications that contraction of the heated and softened material of the top layer plays a part. It is also possible that as a result of the pressure exerted by the lower layer the top layer heated at very high temperature cracks open. The height of the energy level at which the slot formation takes place depends on various factors. In the first place on the extent of absorption of the laser light in the recording layer. The type of dye and the quantity by weight thereof are of importance. Another important factor is the composition of the synthetic resin used in which in particular the decomposition temperature, the evaporation temperature, and the sublimation temperature play a part.

In a favorable embodiment of the method according to the invention a recording element is used in which the same dye is used in both layers of synthetic resin of the recording double layer.

In a favorable embodiment the first synthetic resin layer of the recording double layer comprises a quantity of dye of from 10 to 30% by weight and the second layer of synthetic resin comprises a quantity of dye from 5–40% by weight. Examples of suitable dyes of are Colour Index (C.U.) Solvent Red dyes, for example, C.I. Solvent Red 26 and CI Solvent Red 92.

A very interesting embodiment of the method according to the invention which is particularly suitable especially for practical application is characterized in that the recording double layer is exposed to the laser light which is composed of a continuous uninterrupted beam of a comparatively low energy level, the basic level, and a discontinuous beam which is pulsated in accordance with the information to be recorded and is superimposed on the continuous beam of the basic level, in which as a result of the exposure to only the continuous beam of the basic level a continuous, hence uninterrupted, dikes part is formed in the recording layer and in those places of the recording double layer which are also exposed to the superimposed discontinuous beam, a groove is formed in the dikes part which groove is representative of the recorded information.

A high information density is achieved in a simple manner by the use of the said preferred method. In order to illustrate this it is first to be noted that in optical recording in general the recorded bits are arranged in an information track which usually is spiral-like or is constructed from concentric circles. A certain distance, the so-called track pitch, must be present between the turns of the information track in order to prevent detrimental effects upon reading which would otherwise occur, for example, cross-talk. The track pitch is at least as wide as the width of the information track itself. When the information bits consist of bumps the track pitch must hence be at least as wide as the width dimension of the bumps.

If, however, as in the preferred method mentioned hereinbefore, information bits are formed in the form of grooves having a very small width dimension of, for example, 0.1 $\mu$m to 0.4 $\mu$m, the dikes on which the grooves are positioned may engage each other so that no track pitch between the turns of the dyke is necessary. For this purpose the information density is increased by at least a factor 2.

According to the preferred method, by using the laser light basic power, a continuous, i.e. uninterrupted dike is formed. Of course it is also possible in a modified embodiment of the said preferred method to form a discontinuous interrupted dike by temporarily bringing the basic power at the zero level. In the most pronounced form of said modified embodiment each groove is present on a separate dike portion, hence on a bump.

In a further favorable embodiment of the method according to the invention the recording double layer is exposed successively to a first continuous laser light beam of a low energy level, the basic level, and to a second pulsating laser light beam pulsated according to the information to be recorded in which as a result of the exposure to the first beam a continuous dike part is formed in the recording double layer and as a result of the exposure to the second beam, grooves are formed in the dike, the grooves being representative of the recorded information.

According to the last-mentioned preferred embodiment it is very well possible to provide a very wide dike or dike portion in the recording double layer by using a continuous and wide laser light beam of the basic level and then providing a number of information tracks or a number of turns of a spiral-like information track on this dike by the use of the pulsated second laser light beam, which track or tracks comprise(s) grooves which form the information bits. In a further favorable embodiment the continuous dike parts are merged into a plateau in the radial direction. This can be realised by using a small track pitch of, for example, 0.1 $\mu$m or smaller.

The invention further relates to a recording element which can be manufactured by using the method according to the invention.

More in particular the invention relates to a recording element in which optically readable information bits have been recorded by exposure to modulated laser light, comprising a substrate plate which on one side has a recording double layer with a first sub-layer of a synthetic resin which comprises a dye which absorbs the said laser light, has a comparatively high coefficient of thermal expansion and a glass transition temperature which is below room temperature, and with a second sub-layer which is bonded to the first sub-layer, comprises a dye which absorbs the said laser light, has a comparatively low coefficient of thermal expansion and a glass transition temperature which is above room temperature, in which as a result of the said exposure bumps or dike portions are formed in the recording double layer which on the top side comprise grooves which form the optically readable information bits.

The recording element according to the invention may be used as a master plate in a method of manufacturing metal matrices which in their turn are used in the manufacture of optically readable information carriers formed of a synthetic resin, for example those that are known as compact discs or laser vision (T.M) discs.

The invention also relates to a method for producing matrices. More in particular the invention relates to a method of manufacturing metal matrices which are suitable for use in the production of optically readable synthetic resin information carriers, in which a recording element is used which comprises a substrate plate which on one side has a recording double layer of a synthetic resin with a first sub-layer which comprises a laser light-absorbing dye, has a comparatively high coefficient of thermal expansion and a glass transition temperature which is below room temperature, and with a second sub-layer which is bonded to the first, comprises a laser light-absorbing dye, has a comparatively low coefficient of thermal expansion and a glass transition temperature which is above room temperature, in which the recording double layer comprises bumps or dike on the top side of which grooves have been provided which form optically readable information bits, the recording element on the side of the recording double layer being first provided by electroless plating and then by electroplating with a metal shell, the metal shell thus grown being then removed in which the structure of the surface of the recording layer has been copied in the surface of the resulting metal matrix.

The electroless metal layer, for example, a layer of Ni or Ag or Cu may be provided according to a known method, for example, by vapour deposition, sputtering or a chemical deposition process (chemical plating) as described in, for example, Technical Proceedings of the American Electroplaters' Society, June 14–18, 1964, St. Louis, pp. 139–149. Further copies of metal may be made from the resulting matrix by electrodeposition, the so-called mother matrices and son matrices. These latter matrices are used, for example, in an injection moulding or compression moulding process for the manufacture of optically readable information carriers formed of synthetic resin, for example audio discs, known, for example, as compact discs, or video discs known, for example, as laser vision discs.

The invention will now be described in greater detail with reference to the embodiment and the drawing.

Reference numeral 1 in FIG. 1 denotes a substrate plate of a synthetic resin, for example, polycarbonate. The plate may alternatively be manufactured from glass. An expansion layer 2 is provided on the plate 1. The layer 2 comprises a cross-linked urethane elastomer which is commercially available under the tradename Solithane 113 in which 20% by weight of the dye savinyl scarlet is finely dispersed or dissolved. Layer 2 is manufactured by a spin coating process in which a solution of the non cross-linked polyurethane in an organic solvent to which the dye has been added is provided centrally on the substrate plate. The substrate plate is then rotated, the solution spreading uniformly over the surface of the plate 1 and the solvent also evaporating. The resulting layer is then cured by heating or exposure to light, for example, UV light. A retention layer 3 is provided on the expansion layer 2 also by using spin coating. Layer 3 comprises a weakly cross-linked epoxy resin in which 20% by weight of the dye savinyl scarlet has been dissolved or finely dispersed. Layers 2 and 3 together constitute the recording double layer 4. Recording layer 4 is exposed to a beam of laser light denoted by arrow 5.

The laser light beam is focused on the recording layer 4, the spot size of the beam being from 0.5 to 1.0 μm. The wavelength of the laser light is 458, 488 or 514 nm. The laser used has a power of 0.5–10 mW on the recording layer, for example 5 mW. The laser light beam is modulated according to EFM. During the recording of information the plate is rotated at a speed of rotation or 3 to 10 Hz, the laser light beam 5 moving diametrically over the plate. As a result of this a spiral-like track of bits is formed. In the exposed places, the light energy both in the expansion layer 2 in the retention layer 3 is converted into thermal energy. The temperature in both layers increases to far beyond the glass transition temperature of layer 3. The layers 2 and 3 expand as a result of the rise in temperature, the layer 2 expanding more considerably than the layer 3 due to the higher coefficient of thermal expansion. Thus layer 3 is bulged (elongated) further by the strongly expanding layer 2 in which, however, no or no noteworthy plastic deformation occurs. The elongation remains within the elastic limit. An information bit in the form of a bump 6 is formed.

The longitudinal dimension of the bit is from 0.9 to 3.6 μm with intermediate steps of 0.3 μm. The length of the bit is determined by the exposure time which varies, for example, from 700 to 3000 ns. The bits are arranged in a spiral-like information track having a track width of approximately 1.0 μm and a track pitch of 1.6 μm. Upon increasing the power of the laser to a value of 5–40 mW, for example 15 mW, on the recording layer, a bump 7 is also obtained which in the upper surface has a groove 8 having a width dimension of 0.3 to 0.2 μm and a variable longitudinal dimension in accordance with the EFM modulated information to be recorded of 0.9–3.6 μm with intermediate steps of 0.3 μm. The bump 6 and the bumps 7 with grooves 8 are arranged in spiral-like information tracks. So as shown in FIG. 1 two parallel extending spiral-like tracks are present. It is also possible for all the information bits to have the form of bumps 7 having grooves 8. In that case one spiral-like information track is present, which has technological advantages with respect to a two-track system.

Figure 2:
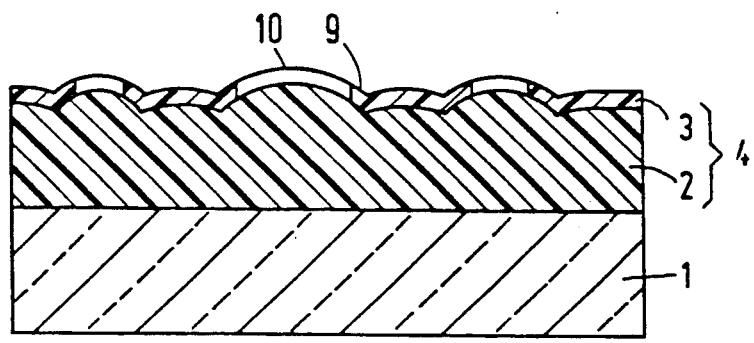
FIG. 2 is a tangential sectional view of an additional embodiment of a recording element of the invention.

In a very attractive embodiment no individual, that is to say separated bumps (with grooves) are used but the bumps are connected together so that a raised dike is formed. FIG. 2 shows an embodiment having still separate bumps. The bumps 9 have different longitudinal dimensions. The same applied to the grooves 10 provided in the upper surface of the bumps 9. The other reference numerals have the same meanings as in FIG. 1.

Figure 3:
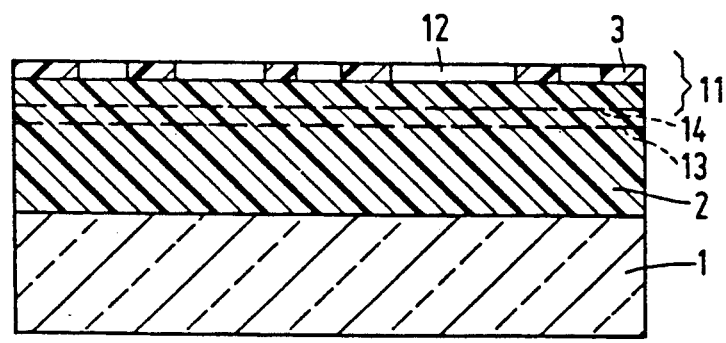
FIG. 3 is a tangential sectional view of an preferred embodiment of the recording element of the invention.

In FIG. 3 the bumps are combined, as it were, to form a dike 11 having grooves 12 which have a variable longitudinal dimension in accordance with the recorded information. The upper and lower surface of that part of the retention layer 3 which is situated beside the dikes 11 is indicated form shown in FIG. 3 is obtained by exposing the recording element to a continuous laser light beam having a power of 4 mW on the recording layer 4 and on this power a superimposed power to a total power of 10 mW, the superimposed power being modulated (pulsated) in accordance with the information to be recorded. The continuous laser light beam produces the formation of the dike element. By the pulsated extra power the grooves 12 are formed. The dikes with grooves, i.e. the information track, is spiral-like. The turns thereof engage each other so that no space is present between the dike portions of successive turns and the dikes are combined to form a single plateau. Such a formation of a plateau occurs with a track pitch ≦1.0 μm. Due to the small width dimension of the grooves of approximately 0.2 μm as compared with that of the of the 1.0 μm of the dikes, the grooves of successive turns of the information track are sufficiently spaced to avoid cross-talk. The information bits (bumps, grooves) are read in the usual manner with weak laser light or with laser light which is not absorbed in the recording layer, on the basis of phase differences. After recording a bit it can be read immediately so that direct check of the recorded bit or bits is possible and consequently the recording system can be corrected or adjusted immediately in the case of errors or deviations, if any, for example by adjusting the objective which focuses the laser light of the recording double layer or by adjusting the laser power.

Figure 4:
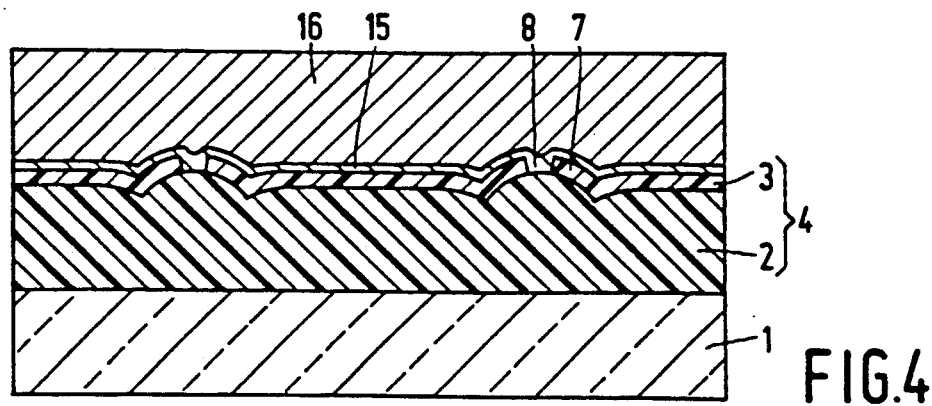
FIG. 4 is a cross-sectional view of a recording element of the invention provided with a metal shell and useful for the manufacture of matrices.

In FIG. 4 the same reference numerals refer to the same components as in FIG. 1. A thin layer of Ag 15 is vapor-deposited on the retention layer 3 in a thickness of 40 nm, optionally after retention layer 3 has been subjected to a corona discharge. An Ni layer 16 is provided on the layer 15 by electrodeposition in a thickness of 200 μm. Finally the resulting metal matrix in which the surface structure of the retention layer has been copied is removed from the recording element (1–4). The recording element is not damaged and can be reused for making a metal matrix.

Optionally further copies of the matrix can be manufactured by electrodeposition. The matrix or the optional further copies are used in an injection moulding or compression moulding process for the manufacture of synthetic resin information carriers, for example CD (compact disc) or laser vision discs.

What is claimed is:

1. A method of manufacturing metal matrices suitable for use in the production of optically readable synthetic resin information carriers said method comprising:
   a) providing a recording element comprising a substrate plate and a synthetic resin recording double layer provided on one side of said substrate plate said double layer comprising a first synthetic resin layer which engages the substrate and has a comparatively high coefficient of thermal expansion and a glass transition temperature which is below room temperature and a second synthetic resin layer bonded to said first synthetic resin layer and has a comparatively low coefficient of thermal expansion and a glass transition temperature which is above room temperature, both said first synthetic resin layer and said second synthetic resin layer comprising a laser light absorbing dye;

(b exposing said recording element to laser light absorbable by said dye, said laser light being of a higher and of a lower energy level, forming bumps or dikes in said recording layer by exposure to said laser-light of the lower energy level, forming bumps or dikes provided with grooves at the surfaces thereof by exposure to said laser light of the higher energy level, said bumps or dikes constituting optically readable information bits;

c) providing first by electroless deposition and then by electroplating a metal shell on the surface of said double layer provided with said bumps or dikes and d) removing said metal shell from said surface thereby forming a metal matrix having a surface bearing the negative of the structure of the surface of said double layer provided with said bumps or dikes.

* * * * *